(12) United States Patent　　(10) Patent No.:　US 12,626,209 B2

Narayan et al.　　(45) Date of Patent:　May 12, 2026

(54) METHOD AND SYSTEM FOR PREDICTING KPI VALUES, PLANT STATES AND ALARMS IN AN INDUSTRIAL PROCESS

(71) Applicant: Honeywell International Inc., Charlotte, NC (US)

(72) Inventors: Anand Narayan, Dehra Dun (IN); Rahul Ravi, Aluva (IN); Rakshitha Prabhu, Bangalore (IN); Akriti Kedia, Faizabad (IN); Priyanshu Sinha, Bangalore (IN); Varshaneya V, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 176 days.

(21) Appl. No.: 18/462,382

(22) Filed: Sep. 6, 2023

(65) Prior Publication Data

US 2025/0078007 A1　　Mar. 6, 2025

(51) Int. Cl.
*G06Q 10/00* (2023.01)
*G06Q 10/04* (2023.01)
*G06Q 10/0639* (2023.01)

(52) U.S. Cl.
CPC ....... *G06Q 10/06393* (2013.01); *G06Q 10/04* (2013.01)

(58) Field of Classification Search
None
See application file for complete search history.

(56) References Cited

U.S. PATENT DOCUMENTS 5,581,459 A * 12/1996 Enbutsu ................. G06N 3/042
　　　　　　　　　　　　　　　700/32
5,859,773 A * 1/1999 Keeler ................. G05B 13/027
　　　　　　　　　　　　　　　706/23

(Continued)

FOREIGN PATENT DOCUMENTS

CN　　　　204650248 U　　9/2015
CN　　　　106295959 A　　1/2017

(Continued)

OTHER PUBLICATIONS

Langone, R., Alzate, C., Bey-Temsamani, A., and Suykens, J. A et al. (Alarm prediction in industrial machines using autoregressive Is-svm models) In 2014 IEEE Symposium on Computational Intelligence and Data Mining (CIDM), pp. 359-364. IEEE) (hereinafter Suykens et al.). (Year: 2014).*

(Continued)

*Primary Examiner* — Hafiz A Kassim

(74) *Attorney, Agent, or Firm* — Seager, Tufte & Wickhem, LLP

(57)　　　　ABSTRACT

Predetermined Key Performance Indicators (KPIs) of an industrial process may be predicted. A plurality of tags each identify a corresponding KPI of the industrial process and historical values for the KPIs that are identified by the plurality of tags. A KPI forecast model is trained for each of the KPIs that are identified by the plurality of tags, wherein each of the KPI forecast models is trained based at least in part on the received historical values for at least some of the KPIs that are identified by the plurality of tags. A forecasted KPI value is generated for each of the KPIs identified by the plurality of tags based at least in part on the corresponding KPI forecast model that corresponds to the respective KPI.

16 Claims, 10 Drawing Sheets

(56) References Cited

U.S. PATENT DOCUMENTS

| | | | |
|---|---|---|---|
| 7,920,935 B2 | 4/2011 | Knipfer et al. | |
| 7,920,983 B1* | 4/2011 | Peleg | G06Q 10/06 |
| | | | 702/50 |
| 8,489,360 B2 | 7/2013 | Lundeberg et al. | |
| 10,699,556 B1* | 6/2020 | Ganapathi | G08B 29/16 |
| 10,809,704 B2 | 10/2020 | Niemiec et al. | |
| 10,984,334 B2 | 4/2021 | Hsiung et al. | |
| 11,005,863 B2 | 5/2021 | Bushey et al. | |
| 11,340,594 B2 | 5/2022 | Bulanda et al. | |
| 2003/0158795 A1* | 8/2003 | Markham | G06Q 10/10 |
| | | | 705/28 |
| 2005/0015624 A1* | 1/2005 | Ginter | H04L 63/145 |
| | | | 726/4 |
| 2009/0204267 A1* | 8/2009 | Sustaeta | G06Q 10/04 |
| | | | 700/36 |
| 2009/0299827 A1 | 12/2009 | Puri et al. | |
| 2010/0289638 A1 | 11/2010 | Borchers et al. | |
| 2013/0182578 A1* | 7/2013 | Eidelman | H04L 43/16 |
| | | | 370/241 |
| 2014/0135947 A1* | 5/2014 | Friman | G05B 13/04 |
| | | | 700/29 |
| 2014/0335480 A1 | 11/2014 | Asenjo et al. | |
| 2014/0349255 A1 | 11/2014 | Watt et al. | |
| 2015/0149134 A1 | 5/2015 | Mehta et al. | |
| 2016/0300027 A1 | 10/2016 | Jensen et al. | |
| 2018/0032940 A1* | 2/2018 | Trenchard | G06Q 10/06393 |
| 2018/0299875 A1 | 10/2018 | Marishwamy et al. | |
| 2019/0129395 A1* | 5/2019 | Niemiec | G05B 23/0235 |
| 2019/0384255 A1* | 12/2019 | Krishnaswamy | G05B 23/024 |
| 2020/0259896 A1* | 8/2020 | Sachs | H04L 67/12 |
| 2021/0124326 A1 | 4/2021 | Ganapathi et al. | |
| 2021/0208545 A1 | 7/2021 | Zhang et al. | |
| 2021/0382470 A1* | 12/2021 | Priyadarsini | G05B 23/0281 |
| 2022/0147039 A1* | 5/2022 | Dix | G05B 23/0283 |
| 2022/0260977 A1* | 8/2022 | Gifford | G01F 15/068 |
| 2024/0022492 A1* | 1/2024 | Nanda | H04L 41/147 |

FOREIGN PATENT DOCUMENTS

| | | |
|---|---|---|
| DE | 102006060903 A1 | 6/2008 |
| EP | 3121667 A1 | 1/2017 |
| JP | 2001100835 A | 4/2001 |

OTHER PUBLICATIONS

Kelly et al., "A Steady State Detection (SSD) Algorithm to Detect Non-Stationary Drifts in Processes," Brigham Young University, BYU Scholars Archive, Faculty Publications, Journal of Process Control, 14 pages, Preprint submitted to Journal of Process Control, Nov. 29, 2012. 2013.

Wikipedia, Estimator, 8 pages, Accessed Oct. 27, 2023.

Zhang, "General Gaussian estimation," Journal of Multivariate Analysis, vol. 169, pp. 234-247, Jan. 2019. Accessed Oct. 27, 2023.

International Search Report and Written Opinion for Application No. PCT/US2019/033654, 7 pages, date mailed Sep. 19, 2019.

Extended European Search Report, EP Application No. 20201654.9, Jul. 13, 2021 (8 pgs).

Aspen Plus® User Guide, Aspen Teachnology, 936 pages, Aspen Technology, Feb. 2000.

Aspen Plus® Version 10 User Guide, Aspen Technology, Inc. 380 pages, Copyright 1999.

DCS (Dome Control System) Version 1.0 User's Guide, 20 pages, 2023.

Honeywell Profit™ Suite, 8 pages, 2018.

Abonyilab, "Alarm Management," 16 pages, Post Date: Sep. 29, 2022, 16 pages.

* cited by examiner

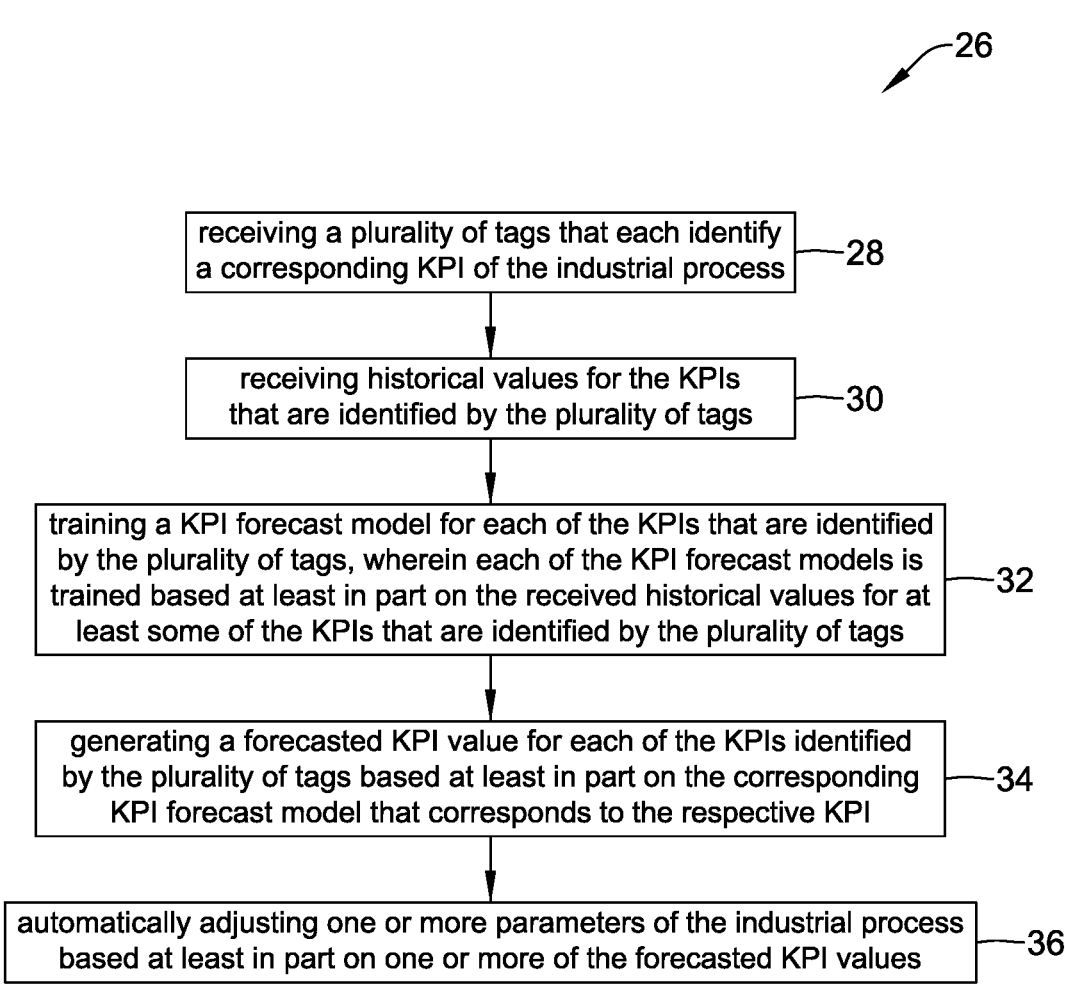

26 receiving a plurality of tags that each identify
a corresponding KPI of the industrial process — 28

↓ receiving historical values for the KPIs
that are identified by the plurality of tags — 30

↓ training a KPI forecast model for each of the KPIs that are identified
by the plurality of tags, wherein each of the KPI forecast models is
trained based at least in part on the received historical values for at — 32
least some of the KPIs that are identified by the plurality of tags

↓ generating a forecasted KPI value for each of the KPIs identified
by the plurality of tags based at least in part on the corresponding — 34
KPI forecast model that corresponds to the respective KPI

↓ automatically adjusting one or more parameters of the industrial process — 36
based at least in part on one or more of the forecasted KPI values

FIG. 2

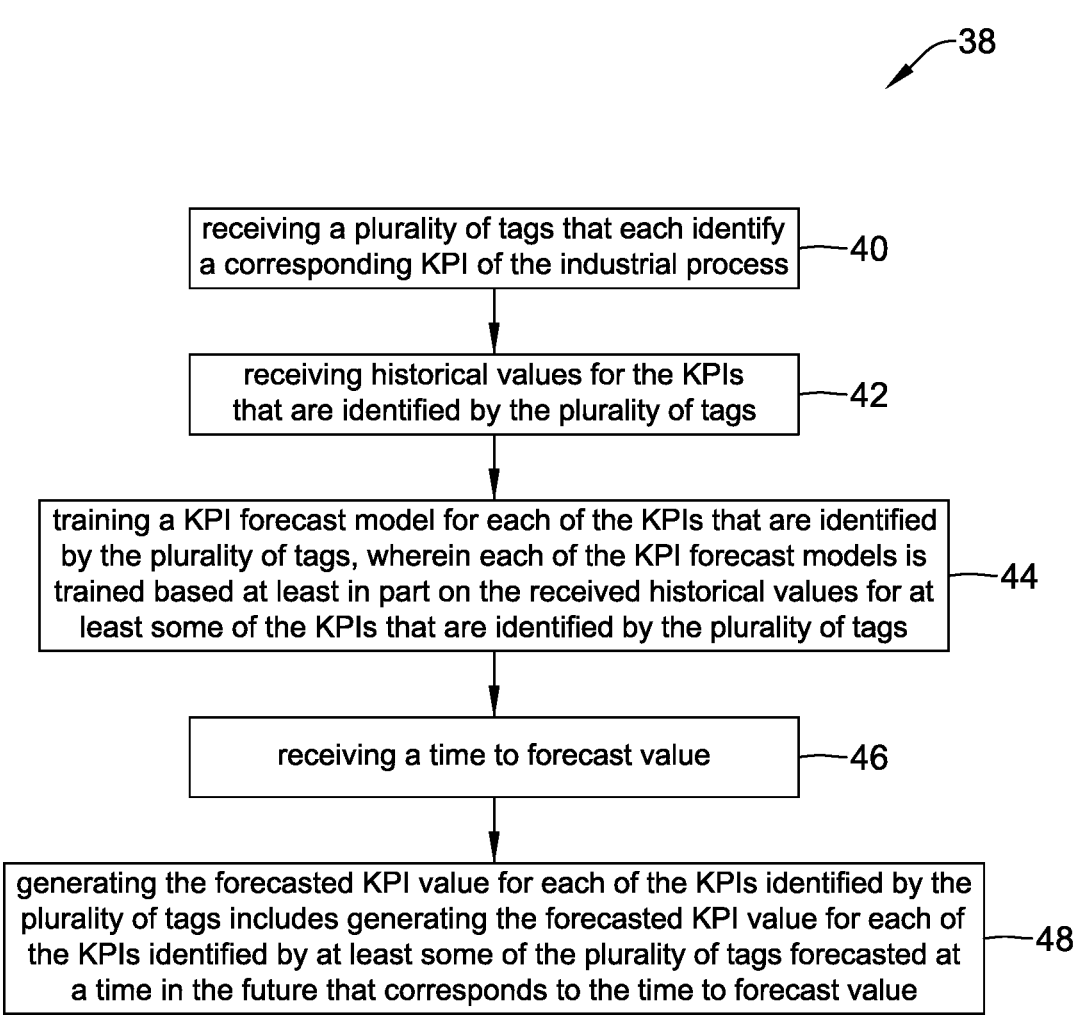

receiving a plurality of tags that each identify
a corresponding KPI of the industrial process ——40 receiving historical values for the KPIs
that are identified by the plurality of tags ——42 training a KPI forecast model for each of the KPIs that are identified
by the plurality of tags, wherein each of the KPI forecast models is
trained based at least in part on the received historical values for at ——44
least some of the KPIs that are identified by the plurality of tags receiving a time to forecast value ——46 generating the forecasted KPI value for each of the KPIs identified by the
plurality of tags includes generating the forecasted KPI value for each of
the KPIs identified by at least some of the plurality of tags forecasted at ——48
a time in the future that corresponds to the time to forecast value

FIG. 3

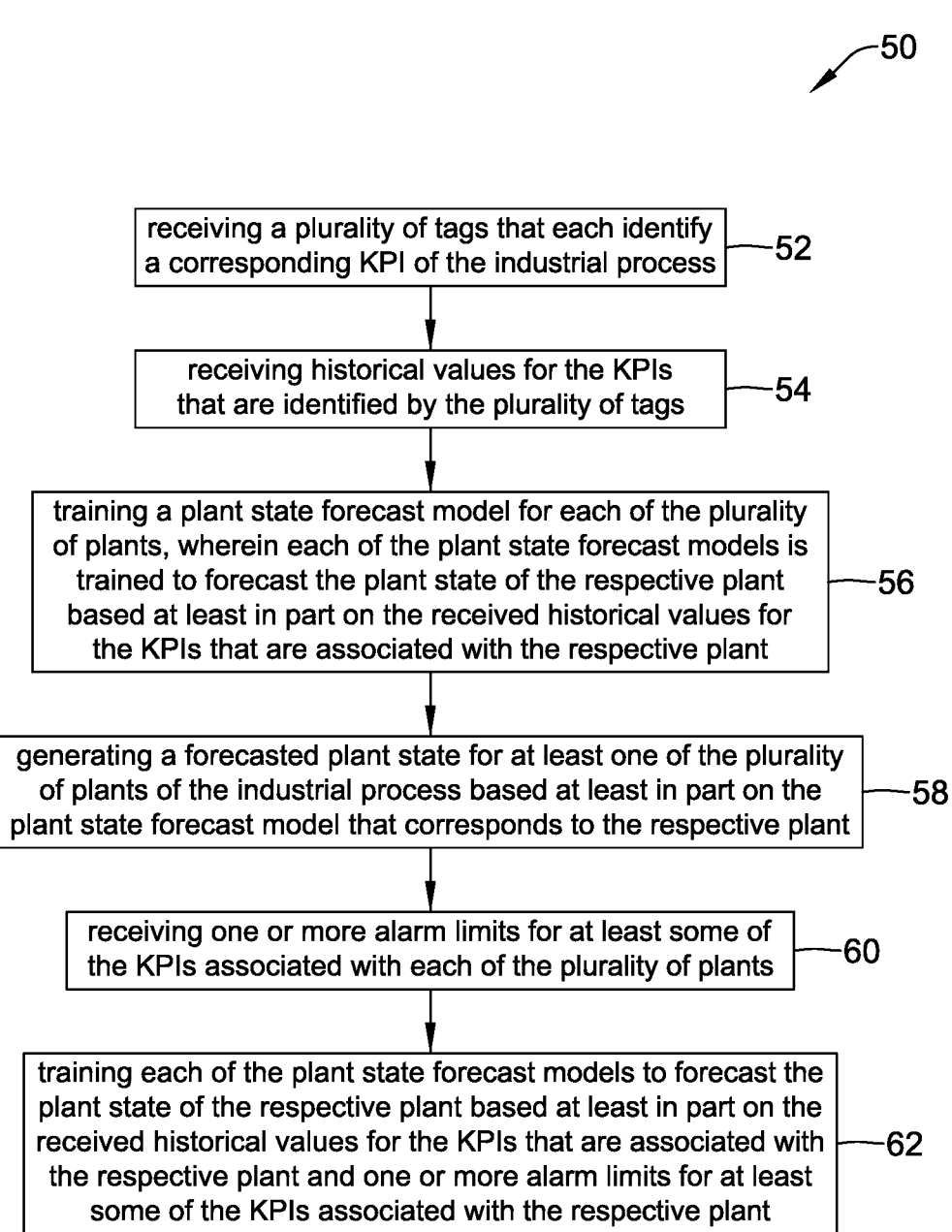

receiving a plurality of tags that each identify
a corresponding KPI of the industrial process —52 receiving historical values for the KPIs
that are identified by the plurality of tags —54 training a plant state forecast model for each of the plurality
of plants, wherein each of the plant state forecast models is
trained to forecast the plant state of the respective plant
based at least in part on the received historical values for
the KPIs that are associated with the respective plant —56 generating a forecasted plant state for at least one of the plurality
of plants of the industrial process based at least in part on the
plant state forecast model that corresponds to the respective plant —58 receiving one or more alarm limits for at least some of
the KPIs associated with each of the plurality of plants —60 training each of the plant state forecast models to forecast the
plant state of the respective plant based at least in part on the
received historical values for the KPIs that are associated with
the respective plant and one or more alarm limits for at least
some of the KPIs associated with the respective plant —62

FIG. 4

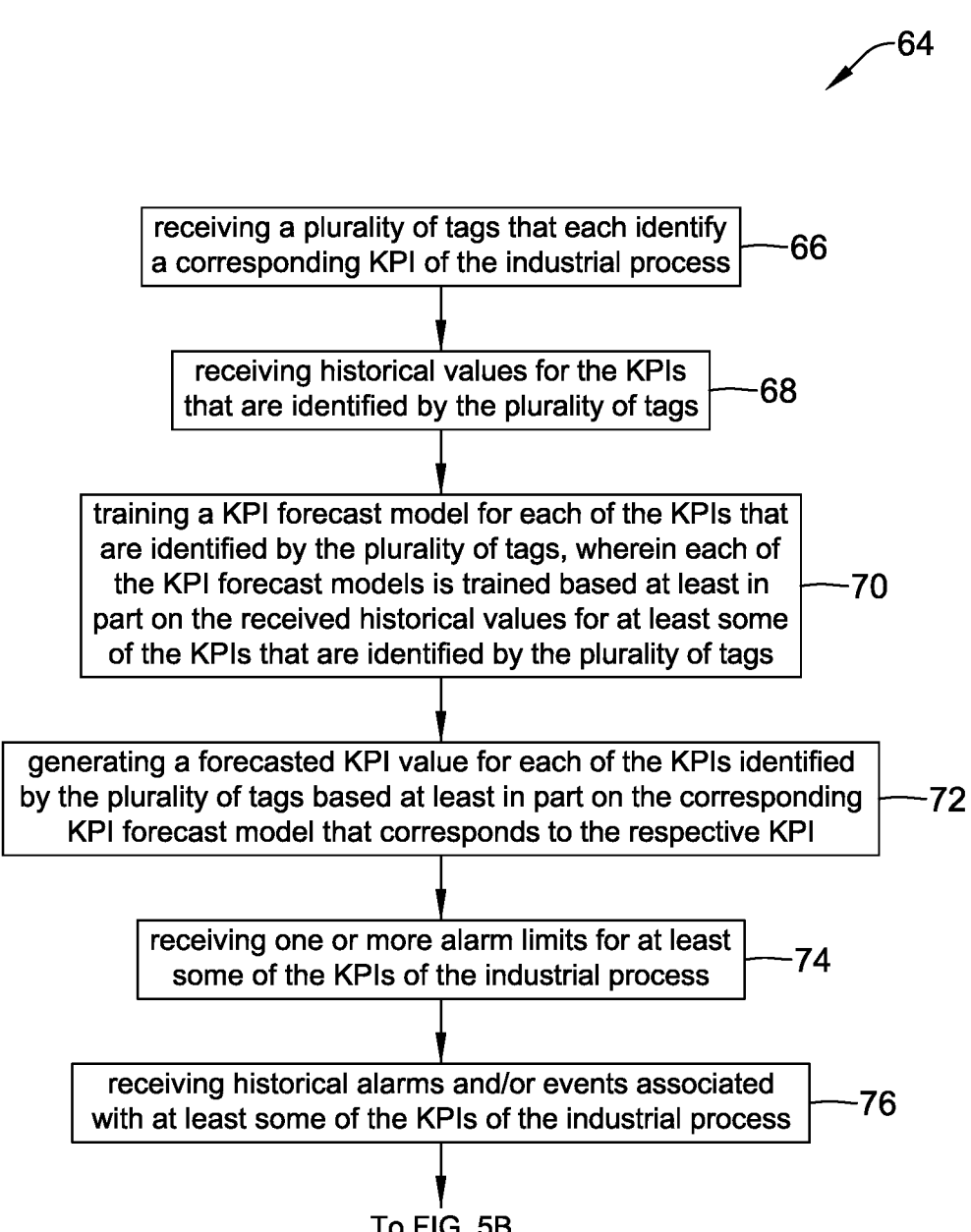

64 receiving a plurality of tags that each identify
a corresponding KPI of the industrial process ——66 receiving historical values for the KPIs
that are identified by the plurality of tags ——68 training a KPI forecast model for each of the KPIs that
are identified by the plurality of tags, wherein each of
the KPI forecast models is trained based at least in
part on the received historical values for at least some
of the KPIs that are identified by the plurality of tags ——70 generating a forecasted KPI value for each of the KPIs identified
by the plurality of tags based at least in part on the corresponding
KPI forecast model that corresponds to the respective KPI ——72 receiving one or more alarm limits for at least
some of the KPIs of the industrial process ——74 receiving historical alarms and/or events associated
with at least some of the KPIs of the industrial process ——76

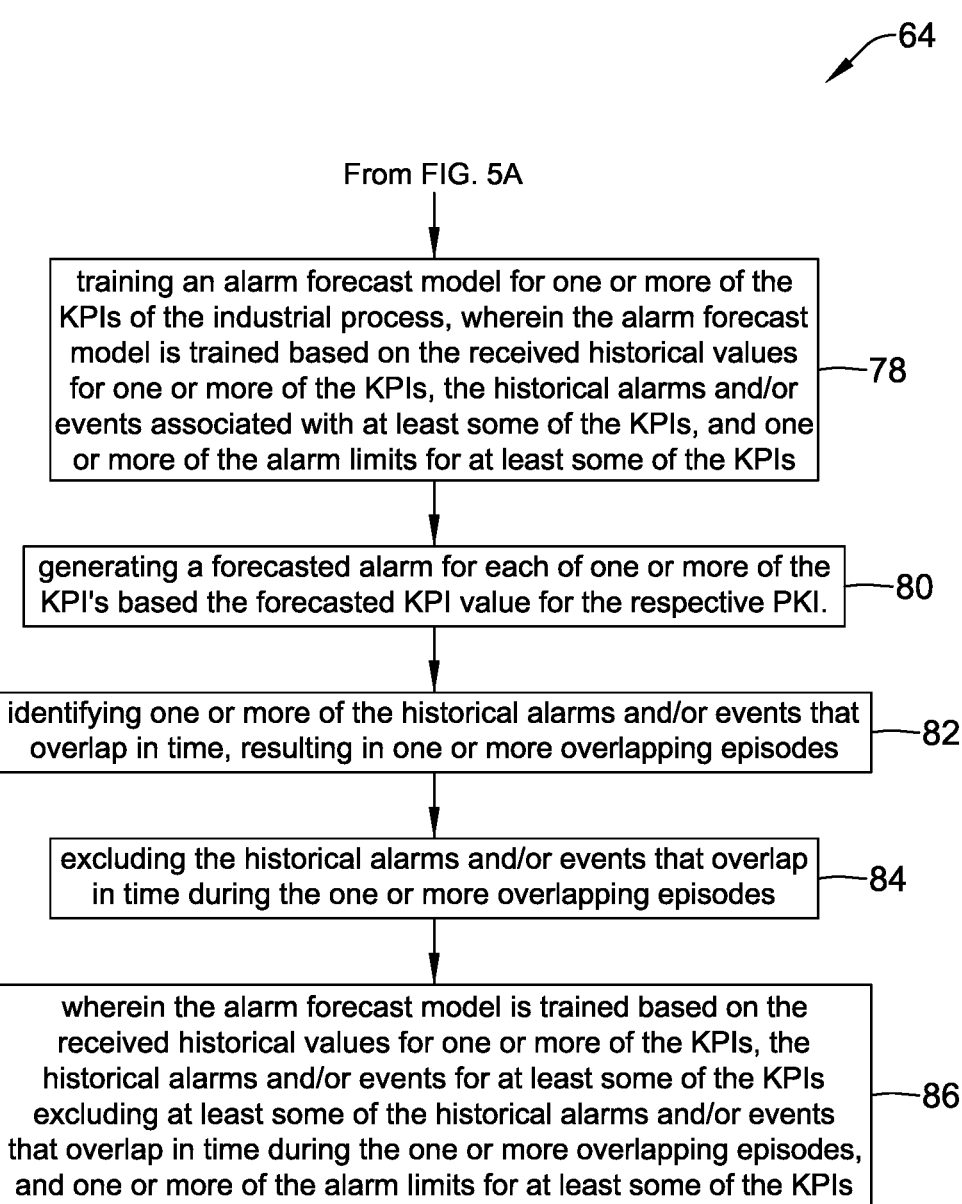

From FIG. 5A training an alarm forecast model for one or more of the KPIs of the industrial process, wherein the alarm forecast model is trained based on the received historical values for one or more of the KPIs, the historical alarms and/or events associated with at least some of the KPIs, and one or more of the alarm limits for at least some of the KPIs — 78 generating a forecasted alarm for each of one or more of the KPI's based the forecasted KPI value for the respective PKI. — 80 identifying one or more of the historical alarms and/or events that overlap in time, resulting in one or more overlapping episodes — 82 excluding the historical alarms and/or events that overlap in time during the one or more overlapping episodes — 84 wherein the alarm forecast model is trained based on the received historical values for one or more of the KPIs, the historical alarms and/or events for at least some of the KPIs excluding at least some of the historical alarms and/or events that overlap in time during the one or more overlapping episodes, and one or more of the alarm limits for at least some of the KPIs — 86

FIG. 5B

METHOD AND SYSTEM FOR PREDICTING KPI VALUES, PLANT STATES AND ALARMS IN AN INDUSTRIAL PROCESS

TECHNICAL FIELD

The present disclosure relates to industrial processes and more particularly to methods and systems for predicting KPI values, plant states and/or alarms in an industrial process.

BACKGROUND

A wide range of industrial processes are known. Many industrial processes are large, complex processes that can be difficult to monitor and control, in part because an industrial process may involve a large number of different equipment, each of which may generate large volumes of operational data. As an example, in a complex process plant such as a refinery or a petrochemical complex, an operator may be responsible for monitoring thousands of parameters such as pressures, levels, flows, and temperatures. Current automation systems are not able to take all necessary actions when deviations occur, and human interaction is needed. Experienced operators with years of service can often manage an industrial process fairly well by taking appropriately timed control actions when deviations occur. However, some operators may be inexperienced, and may not have the experience in dealing with each possible deviation that may occur. Taking an inappropriate action may cause the deviation to become worse, or may cause deviations in other parameters. What would be desirable are methods and systems for monitoring and controlling industrial processes. What would be desirable are methods and systems for predicting KPI values, plant states and/or alarms in an industrial process to aid an operator in taking appropriately timed actions to properly manage the industrial process.

SUMMARY

The present disclosure relates to industrial processes and more particularly to methods and systems for predicting KPI values, plant states and/or alarms in an industrial process. An example may be found in a method for predicting predetermined Key Performance Indicators (KPIs) of an industrial process. The illustrative method includes receiving a plurality of tags that each identify a corresponding KPI of the industrial process and receiving historical values for those KPIs that are identified by the plurality of tags. A KPI forecast model is trained for each of the KPIs that are identified by the plurality of tags, wherein each of the KPI forecast models is trained based at least in part on the received historical values for at least some of the KPIs that are identified by the plurality of tags. A forecasted KPI value is generated for each of the KPIs identified by the plurality of tags based at least in part on the corresponding KPI forecast model that corresponds to the respective KPI.

Another example may be found in a system for predicting predetermined Key Performance Indicators (KPIs) of an industrial process. The system includes an I/O port, a memory, and a controller operatively coupled to the I/O port and the memory. The controller is configured to receive via the I/O port a plurality of tags that each identify a corresponding KPI of the industrial process and to receive via the I/O port historical values for those KPIs that are identified by the plurality of tags. The controller is configured to train a KPI forecast model for each of the KPIs that are identified by the plurality of tags, wherein each of the KPI forecast models is trained based at least in part on the received historical values for at least some of the KPIs that are identified by the plurality of tags. The controller is configured to generate a forecasted KPI value for each of the KPIs identified by the plurality of tags based at least in part on the corresponding KPI forecast model that corresponds to the respective KPI.

Another example may be found in a non-transitory computer readably medium storing instructions that when executed by one or more processors causes the one or more processors to receive a plurality of tags that each identify a corresponding KPI of an industrial process and to receive historical values for those KPIs that are identified by the plurality of tags. The one or more processors are caused to train a KPI forecast model for each of the KPIs that are identified by the plurality of tags, wherein each of the KPI forecast models is trained based at least in part on the received historical values for at least some of the KPIs that are identified by the plurality of tags. The one or more processors are caused to generate a forecasted KPI value for each of the KPIs identified by the plurality of tags based at least in part on the corresponding KPI forecast model that corresponds to the respective KPI.

The preceding summary is provided to facilitate an understanding of some of the innovative features unique to the present disclosure and is not intended to be a full description. A full appreciation of the disclosure can be gained by taking the entire specification, claims, figures, and abstract as a whole.

BRIEF DESCRIPTION OF THE FIGURES

The disclosure may be more completely understood in consideration of the following description of various examples in connection with the accompanying drawings, in which:

FIG. 2 is a flow diagram showing an illustrative method for predicting KPIs;

FIG. 3 is a flow diagram showing an illustrative method for predicting KPIs;

FIG. 4 is a flow diagram showing an illustrative method for predicting KPIs;

FIGS. 5A and 5B are flow diagrams that together show an illustrative method for predicting KPIs;

Figure 1:
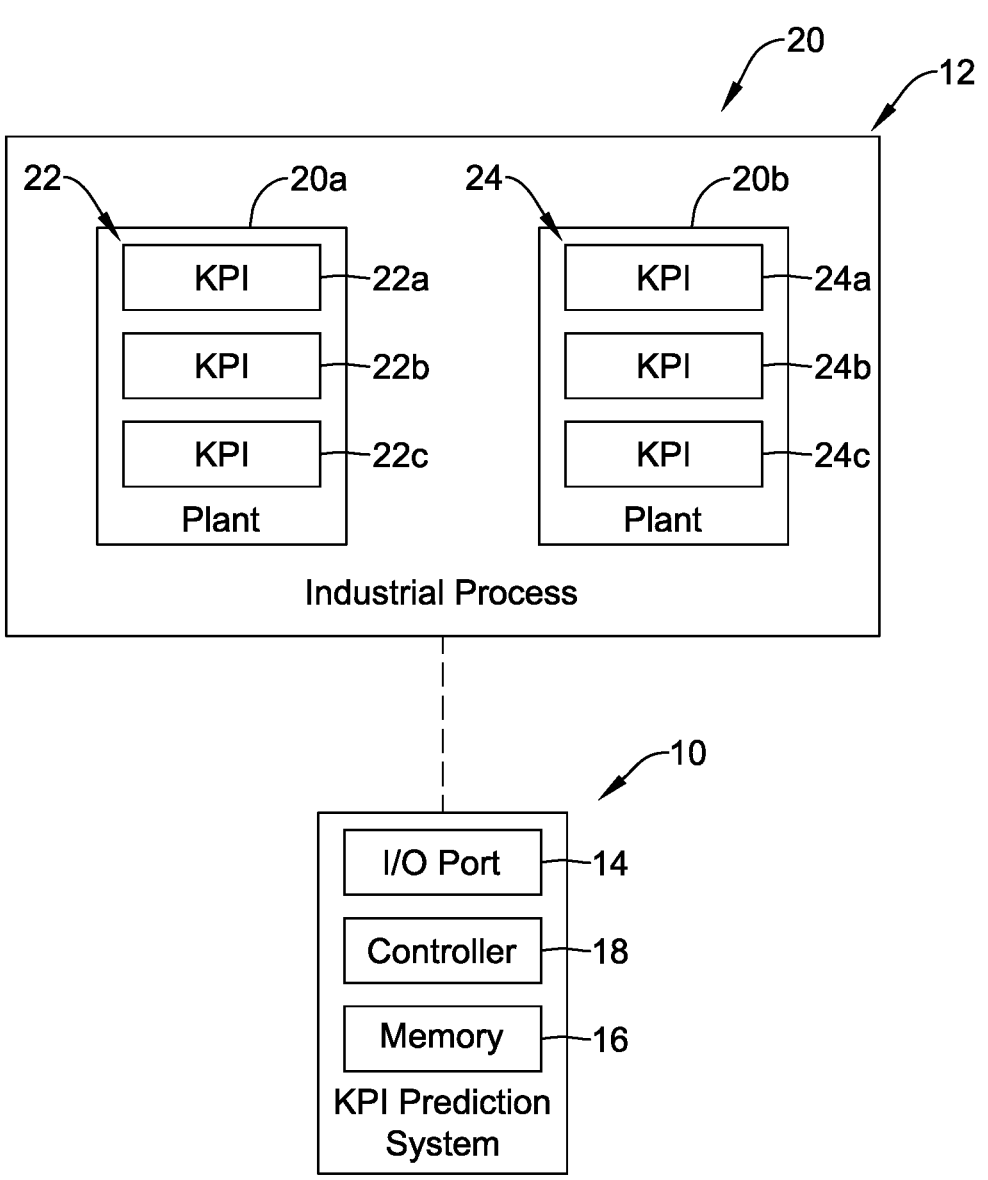
FIG. 1 is a schematic block diagram of an illustrative system for predicting KPIs for an industrial process.

While the disclosure is amenable to various modifications and alternative forms, specifics thereof have been shown by way of example in the drawings and will be described in detail. It should be understood, however, that the intention is not to limit the disclosure to the particular examples described. On the contrary, the intention is to cover all modifications, equivalents, and alternatives falling within the spirit and scope of the disclosure.

DESCRIPTION

The following description should be read with reference to the drawings, in which like elements in different drawings are numbered in like fashion. The drawings, which are not necessarily to scale, depict examples that are not intended to limit the scope of the disclosure. Although examples are illustrated for the various elements, those skilled in the art will recognize that many of the examples provided have suitable alternatives that may be utilized.

All numbers are herein assumed to be modified by the term "about", unless the content clearly dictates otherwise. The recitation of numerical ranges by endpoints includes all numbers subsumed within that range (e.g., 1 to 5 includes 1, 1.5, 2, 2.75, 3, 3.80, 4, and 5).

As used in this specification and the appended claims, the singular forms "a", "an", and "the" include the plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is contemplated that the feature, structure, or characteristic is described in connection with an embodiment, it is contemplated that the feature, structure, or characteristic may be applied to other embodiments whether or not explicitly described unless clearly stated to the contrary.

FIG. 1 is a schematic block diagram showing an illustrative system 10 for predicting predetermined Key Performance Indicators (KPIs) of an industrial process 12. The system 10 includes an I/O port 14, a memory 16 and a controller 18 that is operatively coupled to the I/O port 14 and to the memory 16. The industrial process 12 may generically represent any of a variety of different industrial processes. As an example, the industrial process 12 may represent a chemical manufacturing process or an oil refinery process. In some instances, the industrial process 12 may include a number of plants 20, individually labeled as 20a and 20b. While two plants 20 are shown, this is merely illustrative as the industrial process 12 may include only a single plant 20, or may include three or more plants 20. Each of the plants 20 may represent a piece of equipment of the industrial process 12, such as a boiler, a furnace, a distillation tower or the like. In the example shown, each of the plants 20 include a number of Key Performance Indicators (KPIs). As shown, the plant 20a includes a number of KPIs 22, individually labeled as 22a, 22b and 22c, and the plant 20b includes a number of KPIs 24, individually labeled as 24a, 24b and 24c. This is merely illustrative, as the plant 20a may include any number of KPIs 22, and may include substantially more than three KPIs, and the plant 20b may include any number of KPIs 24, and may include substantially more than three KPIs 24.

The controller 18 is configured to receive via the I/O port 14 a plurality of tags that each identify a corresponding KPI 22, 24 of the industrial process 12. In some cases, the plurality of tags only tag certain KPIs of the industrial process 12 that are deemed critical to the operation and control of the industrial process 12. The controller 18 is configured to receive via the I/O port 14 historical values for the KPIs 22, 24 that are identified by the plurality of tags. The controller 18 is configured to train a KPI forecast model for each of the KPIs 22, 24 that are identified by the plurality of tags, wherein each of the KPI forecast models is trained based at least in part on the received historical values for at least some of the KPIs 22, 24 that are identified by the plurality of tags. Each of the KPI forecast models may be an Artificial Intelligence (AI) based model. In some cases, one or more of the KPI forecast models may be trained continuously using updated current and historical values for at least some of the KPIs 22, 24, and thus may continuously learn and track the characteristics of the industrial process. In other cases, one or more of the KPI forecast models may be trained during a training phase, and then the trained model is released for use during an operational phase. In either case, the controller 18 may be configured to generate a forecasted KPI value for each of the KPIs 22, 24 identified by the plurality of tags based at least in part on the corresponding KPI forecast model that corresponds to the respective KPI 22, 24. In some instances, the controller 18 may be configured to automatically adjust one or more parameters of the industrial process 12 based at least in part on one or more of the forecasted KPI values.

In some instances, each of the KPI forecast models may be trained based at least in part on the received historical values for at least some of the KPIs 22, 24 of the industrial process 12 that are identified by the plurality of tags and one or more of the forecasted KPI values. In some instances, when the industrial process 12 includes a plurality of plants 20, and each plant may include two or more tags of the plurality of tags that each identify a corresponding KPI 22, 24 of the corresponding plant 20, and each plant 20 may have two or more predetermined plant states. The controller 18 may be configured to train a plant state forecast model for each of the plurality of plants 20, wherein each of the plant state forecast models is trained to forecast the plant state of the respective plant 20 based at least in part on the received historical values for the KPIs 22, 24 that are associated with the respective plant 20 and/or the forecasted KPI values for the KPIs 22, 24 that are associated with the respective plant 20. The controller 18 may be configured to generate a forecasted plant state for at least one of the plurality of plants 20 of the industrial process 12 based at least in part on the plant state forecast model that corresponds to the respective plant 20.

In some instances, the controller 18 may be configured to receive one or more alarm limits for at least some of the KPIs 22, 24 of the industrial process 12 and to receive historical alarms and/or events associated with at least some of the KPIs 22, 24 of the industrial process 12. The controller 18 may be configured to train an alarm forecast model for one or more of the KPIs 22, 24 of the industrial process 12, wherein the alarm forecast model is trained based on the received historical values for one or more of the KPIs 22, 24 and/or one or more of the forecasted KPI values, the historical alarms and/or events associated with at least some of the KPIs 22, 24, and one or more of the alarm limits for at least some of the KPIs 22, 24.

FIG. 2 is a flow diagram showing an illustrative method 26 for predicting predetermined Key Performance Indicators (KPIs) of an industrial process (such as the industrial process 12). The illustrative method 26 includes receiving a plurality of tags that each identify a corresponding KPI of the industrial process, as indicated at block 28. In some cases, the plurality of tags only tag certain KPIs of the industrial process 12 that are deemed critical to the operation and control of the industrial process 12. Historical values for the KPIs that are identified by the plurality of tags are received, as indicated at block 30. A KPI forecast model is trained for each of the KPIs that are identified by the plurality of tags, wherein each of the KPI forecast models is trained based at least in part on the received historical values for at least some of the KPIs that are identified by the plurality of tags, as indicated at block 32. Each of the KPI forecast models may be an Artificial Intelligence (AI) based model. In some cases, one or more of the KPI forecast models may be trained continuously using updated current and historical values for at least some of the KPIs, and thus may continuously learn and track the characteristics of the industrial process. In other cases, one or more of the KPI forecast models may be trained during a training phase, and then the trained model is released for use during an operational phase. In either case, a forecasted KPI value is generated for each of the KPIs identified by the plurality of tags based at least in part on the corresponding KPI forecast model that corresponds to the respective KPI, as indicated at block 34. In some instances, the method 26 may include automatically adjusting one or more parameters of the industrial process based at least in part on one or more of the forecasted KPI values, as indicated at block 36.

FIG. 3 is a flow diagram showing an illustrative method 38 for predicting predetermined Key Performance Indicators (KPIs) of an industrial process (such as the industrial process 12). The illustrative method 38 includes receiving a plurality of tags that each identify a corresponding KPI of the industrial process, as indicated at block 40. In some cases, the plurality of tags only tag certain KPIs of the industrial process that are deemed critical to the operation and control of the industrial process. Historical values for the KPIs that are identified by the plurality of tags are received, as indicated at block 42. A KPI forecast model is trained for each of the KPIs that are identified by the plurality of tags, wherein each of the KPI forecast models is trained based at least in part on the received historical values for at least some of the KPIs that are identified by the plurality of tags, as indicated at block 44. Each of the KPI forecast models may be an Artificial Intelligence (AI) based model. In some cases, one or more of the KPI forecast models may be trained continuously using updated current and historical values for at least some of the KPIs, and thus may continuously learn and track the characteristics of the industrial process. In other cases, one or more of the KPI forecast models may be trained during a training phase, and then the trained model is released for use during an operational phase. In either case, and in the example shown, a time to forecast value is received, as indicated at block 46. The time to forecast represents a target time into the future to forecast the forecasted KPI values. A forecasted KPI value is generated for each of the KPIs identified by the plurality of tags to correspond to a time in the future that corresponds to the time to forecast value, as indicated at block 48. In some instances, each of the KPI forecast models may be trained based at least in part on the received historical values for at least some of the KPIs of the industrial process that are identified by the plurality of tags and one or more of the forecasted KPI values.

FIG. 4 is a flow diagram showing an illustrative method 50 for predicting predetermined Key Performance Indicators (KPIs) of an industrial process (such as the industrial process 12). The illustrative method 50 includes receiving a plurality of tags that each identify a corresponding KPI of the industrial process, as indicated at block 52. In some cases, the plurality of tags only tag certain KPIs of the industrial process that are deemed critical to the operation and control of the industrial process. Historical values for the KPIs that are identified by the plurality of tags are received, as indicated at block 54. A plant state forecast model is trained for each of the plurality of plants, wherein each of the plant state forecast models is trained to forecast the plant state (e.g. normal, tripped, cold shutdown, hot shutdown) of the respective plant based at least in part on the received historical values for the KPIs that are associated with the respective plant and/or the forecasted KPI values for the KPIs that are associated with the respective plant, as indicated at block 56. Each of the plant state forecast models may be an Artificial Intelligence (AI) based model. In some cases, one or more of the plant state forecast models may be trained continuously using updated current and historical values for at least some of the KPIs associated with the respective plan, and thus may continuously learn and track the characteristics of the respective plant. In other cases, one or more of the plant state forecast models may be trained during a training phase, and then the trained model is released for use during an operational phase. In either case, a forecasted plant state is generated for at least one of the plurality of plants of the industrial process based at least in part on the plant state forecast model that corresponds to the respective plant, as indicated at block 58. In some instances, each of the plant state forecast models may be used to forecast the plant state of the respective plant based at least in part on the received historical values for the KPIs that are associated with the respective plant and one or more of the forecasted KPI values for one or more of the KPIs that are associated with the respective plant.

In some instances, the method 50 may further include receiving one or more alarm limits for at least some of the KPIs associated with each of the plurality of plants, as indicated at block 60. In some instances, each of the plant state forecast models may be trained to forecast the plant state of the respective plant based at least in part on the received historical values for the KPIs that are associated with the respective plant (and/or the forecasted KPI values for the KPIs that are associated with the respective plant) and one or more alarm limits for at least some of the KPIs associated with the respective plant, as indicated at block 62. In some instances, each of the plant state forecast models may be trained to forecast the plant state of the respective plant based at least in part on the received historical values for the KPIs that are associated with the respective plant, one or more alarm limits for at least some of the KPIs associated with the respective plant, and one or more of the forecasted KPI values for one or more of the KPIs that are associated with the respective plant.

FIGS. 5A and 5B are flow diagrams that together show an illustrative method 64 for predicting predetermined Key Performance Indicators (KPIs) of an industrial process (such as the industrial process 12). The illustrative method 64 includes receiving a plurality of tags that each identify a corresponding KPI of the industrial process, as indicated at block 66. In some cases, the plurality of tags only tag certain KPIs of the industrial process that are deemed critical to the operation and control of the industrial process. Historical values for the KPIs that are identified by the plurality of tags are received, as indicated at block 68. A KPI forecast model is trained for each of the KPIs that are identified by the plurality of tags, wherein each of the KPI forecast models is trained based at least in part on the received historical values for at least some of the KPIs that are identified by the plurality of tags, as indicated at block at block 70. Each of the KPI forecast models may be an Artificial Intelligence (AI) based model. In some cases, one or more of the KPI forecast models may be trained continuously using updated current and historical values for at least some of the KPIs, and thus may continuously learn and track the characteristics of the industrial process. In other cases, one or more of the KPI forecast models may be trained during a training phase, and then the trained model is released for use during an operational phase. In either case, a forecasted KPI value is generated for each of the KPIs identified by the plurality of tags based at least in part on the corresponding KPI forecast model that corresponds to the respective KPI, as indicated at block 72.

In some instances, the method 64 may include receiving one or more alarm limits for at least some of the KPIs of the industrial process, as indicated at block 74. Historical alarms and/or events associated with at least some of the KPIs of the industrial process may be received, as indicated at block 76. Turning to FIG. 5B, the method 64 continues with training an alarm forecast model for one or more of the KPIs of the industrial process, wherein the alarm forecast model is trained based on the received historical values for one or more of the KPIs (and/or the forecasted KPI values for the KPIs that are associated with the respective plant), the historical alarms and/or events associated with at least some of the KPIs, and one or more of the alarm limits for at least some of the KPIs, as indicated at block 78. In some instances, the alarm forecast model may also trained based on one or more of the forecasted KPI values. In some instances, the method 64 may include generating a forecasted alarm for each of one or more of the KPI's based the forecasted KPI value for the respective PKI, as indicated at block 80.

In some instances, the method 64 may include identifying two or more of the historical alarms and/or events that overlap in time, resulting in one or more overlapping episodes, as indicated at block 82. The historical alarms and/or events that overlap in time during the one or more overlapping episodes may be excluded, as indicated at block 84. The alarm forecast model may be trained based on the received historical values for one or more of the KPIs and/or the forecasted KPI values for the one or more KPIs, the historical alarms and/or events for at least some of the KPIs excluding at least some of the historical alarms and/or events that overlap in time during the one or more overlapping episodes, and one or more of the alarm limits for at least some of the KPIs, as indicated at block 86. In some instances, each of the historical alarms and/or events associated with at least some of the KPIs may identify a source of the historical alarm and/or event, a category of the historical alarm and/or event and a condition of the historical alarm and/or event, and wherein the alarm forecast model may be trained based on the source, the category and/or the condition of one or more of the historical alarm and/or events associated with at least some of the KPIs of the industrial process.

Figure 6:
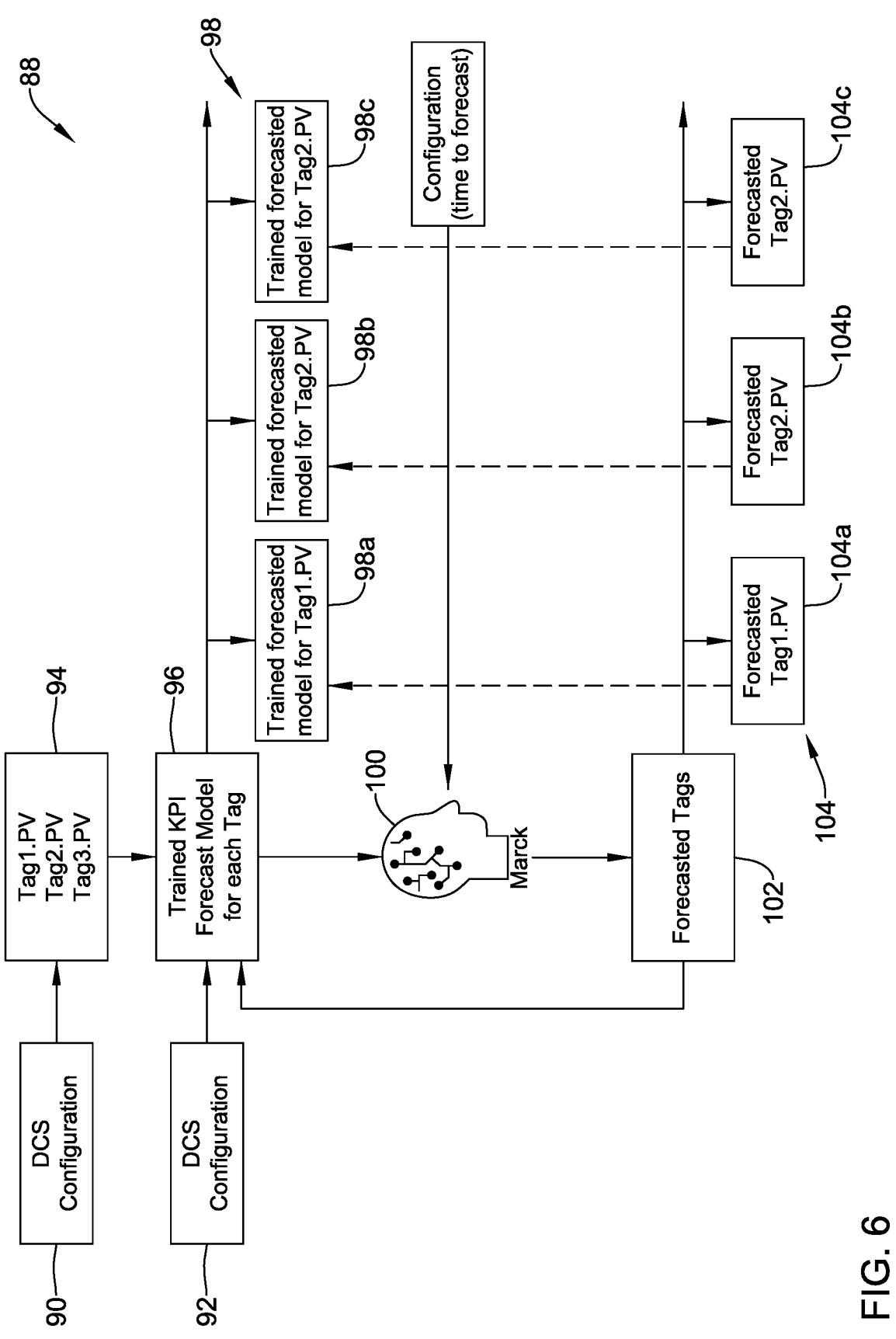
FIG. 6 is a flow diagram showing an illustrative method of forecasting KPIs of an industrial process over a certain extended time window.

FIG. 6 is a flow diagram showing an illustrative workflow 88 for predicting KPIs over time. The method 88 includes receiving tags and alarm configurations from a Distributed Control System (DCS) configuration 90 and getting historical KPI values from a historian 92. The tags are seen at block 94. At block 96, the KPI forecast model is trained for each tagged KPI, resulting in a number of trained KPI forecast models 98, individually labeled as 98a, 98b and 98c. In some instances, there may be any number of trained KPI forecast models 98, and in some cases there may be substantially more than three trained KPI forecast models 98. The trained KPI forecast models 98 are provided to MARCK (Multivariate Auto Regressive Combined KPI forecaster) 100, which is a deep learning model that uses machine learning techniques. MARCK 100 outputs forecasted KPI values for each of the tagged KPIs, as indicated at block 102, resulting in a number of forecasted KPI values 104, individually labeled as 104a, 104b and 104c. In some cases, the forecasted KPI values 104, along with updated historical KPI values from the historian 92, are used to retrain the trained KPI forecast models 98, sometimes continuously.

Figure 7:
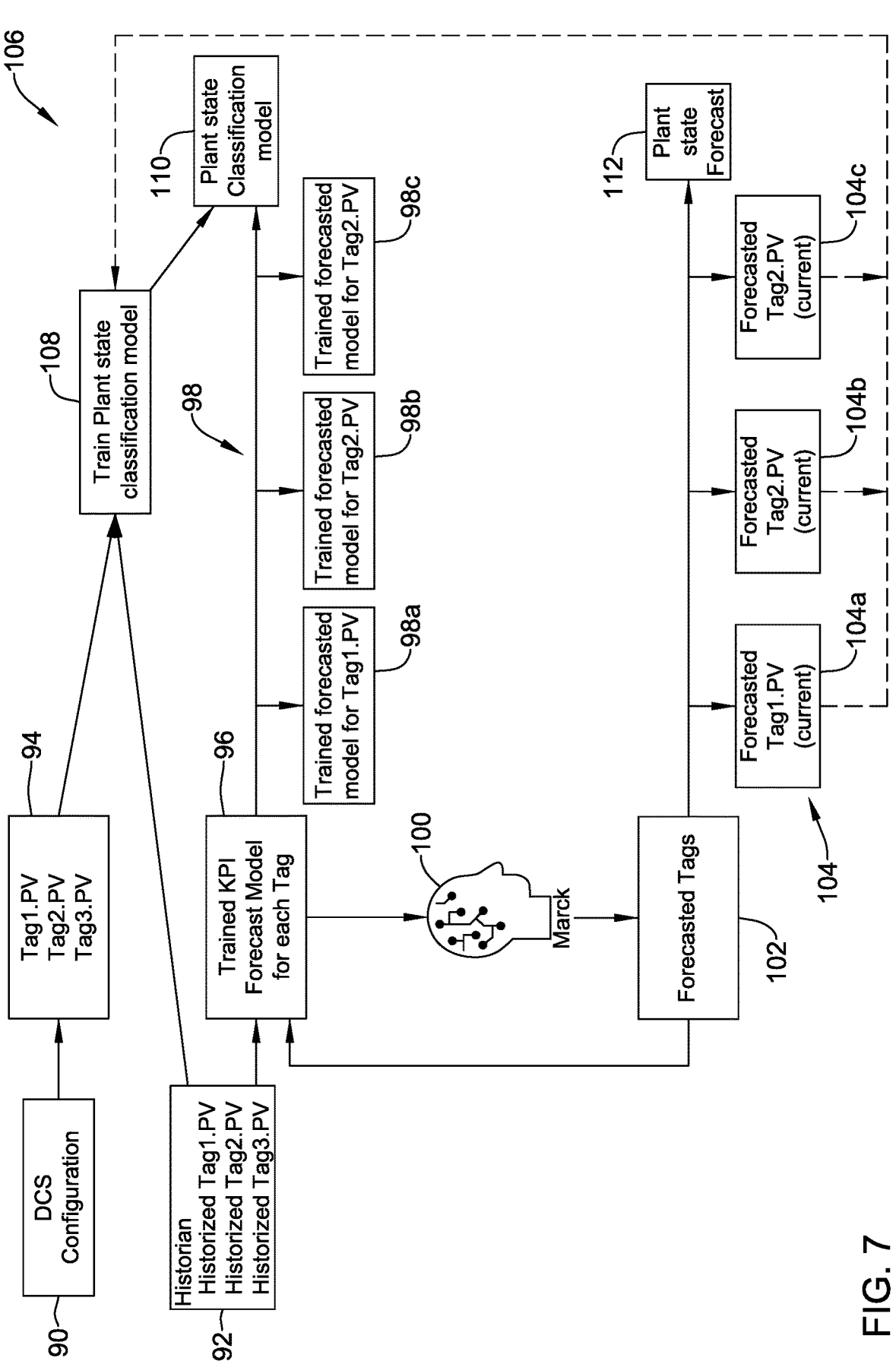
FIG. 7 is a flow diagram showing an illustrative method of forecasting plant states of an industrial process.

FIG. 7 is a flow diagram showing an illustrative workflow 106 that includes many of the same features of FIG. 6, but further includes a block 108 that receives an identifier of the tagged KPIs 94 from the DCS configuration 90, and the historical data for the tagged KPIs from the historian 92. The block 108 trains a plant state classification model and outputs a plant state classification model 110 that receives input from the trained KPI forecast models 98 as shown. The forecasted KPI values 104 may be used to forecast the plant state 112 (e.g. normal, tripped, cold shutdown, hot shutdown) using the plant state classification model 110.

Figure 8:
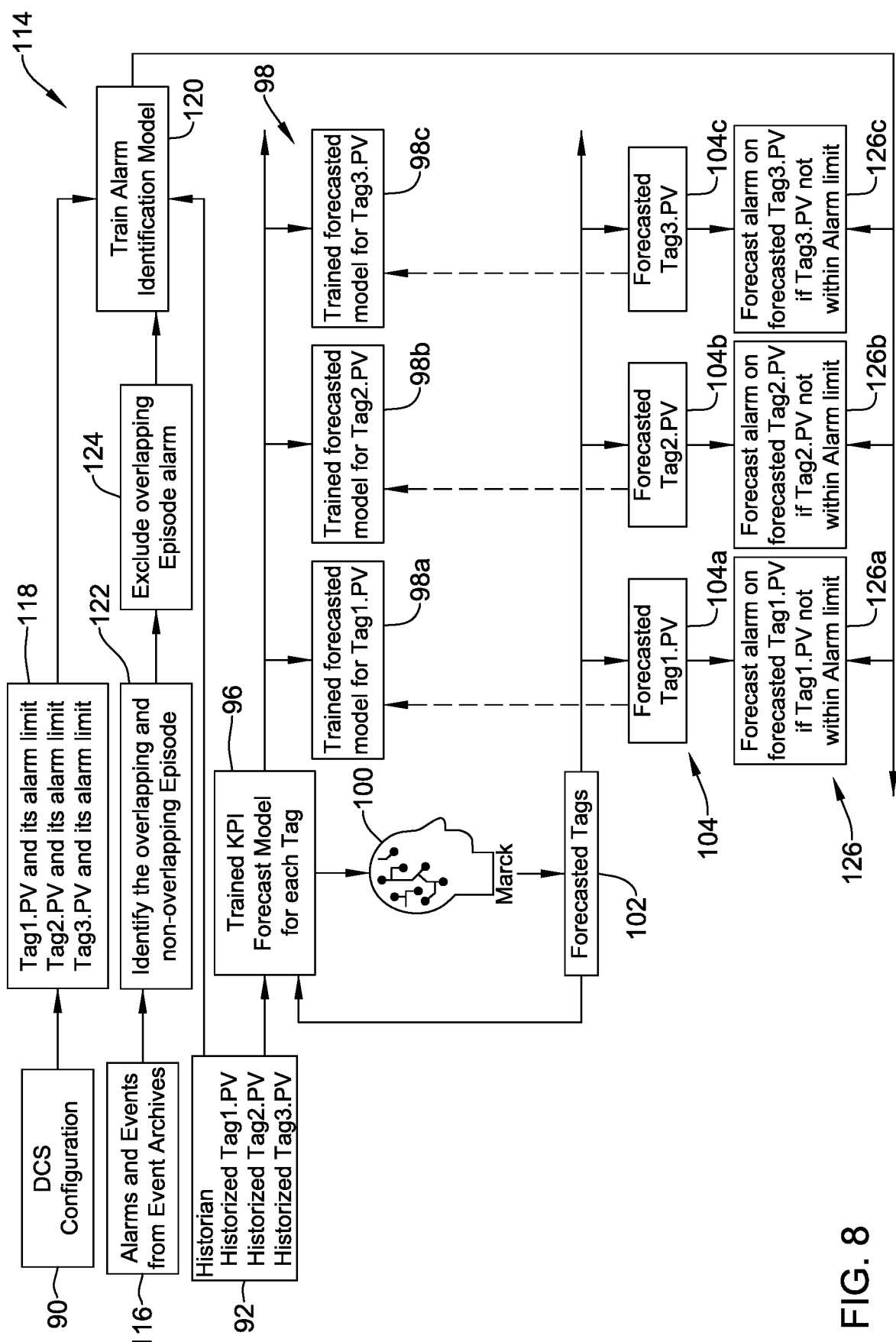
FIG. 8 is a flow diagram showing an illustrative method of forecasting alarms of an industrial process.
Figure 9:
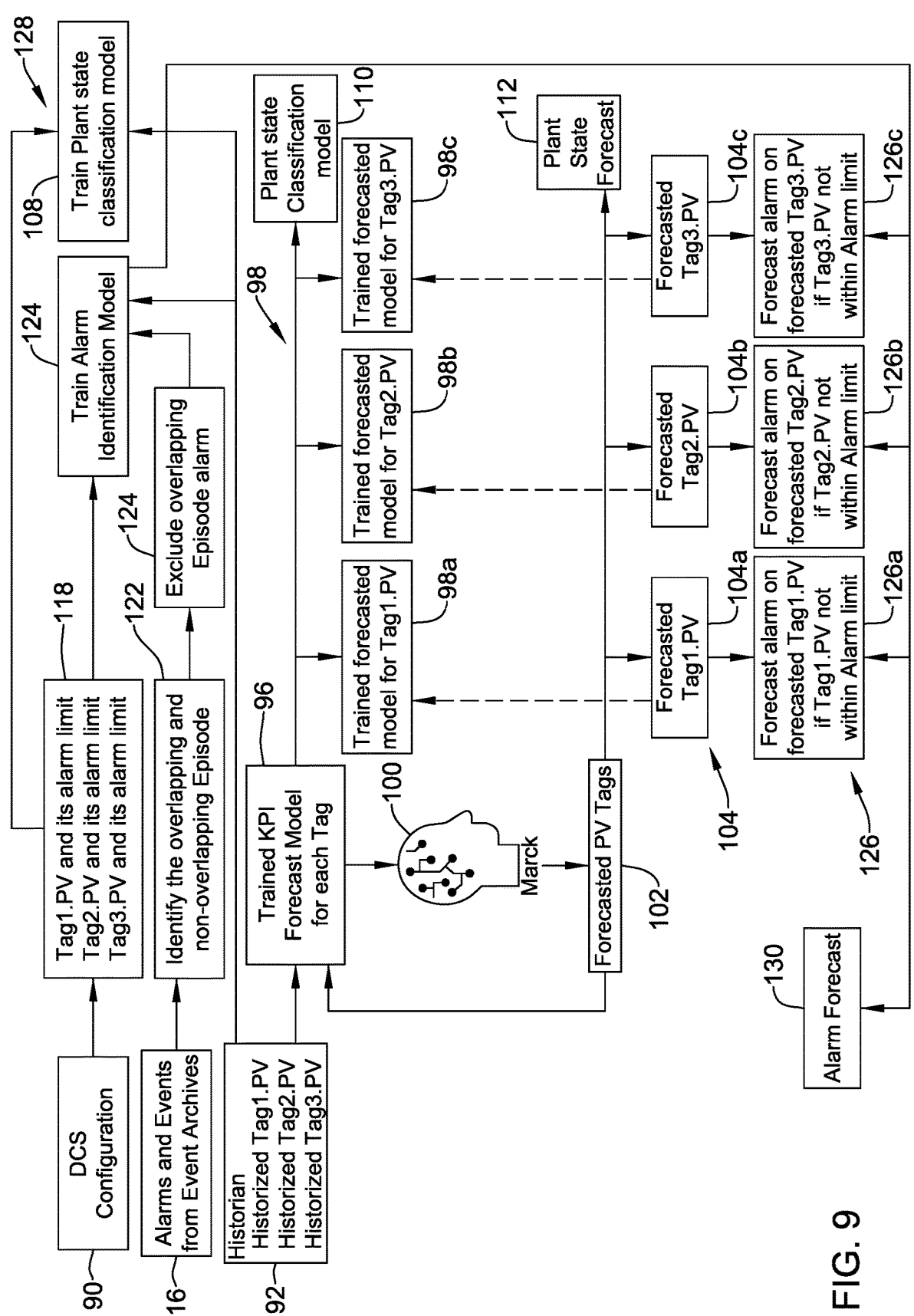
FIG. 9 is a flow diagram showing an illustrative overall process flow.

FIG. 8 is a flow diagram showing an illustrative workflow 114 that includes many of the same features of FIG. 6, but also includes a block 116 that provides historical alarms and events from archives. At a block 118, the tags and alarm limits are associated, and this information is provided to a block 120 where an alarm identification model is trained. The alarms and events from block 116 are provided to a block 122, where overlapping and non-overlapping alarms and events are identified. At block 124, overlapping alarms and events are excluded, and the remaining alarms and events are provided to the block 120. Information from the historian 92 is provided to the block 120, which trains and outputs an alarm identification model 120. Each of the forecasted KPI values 104, individually labeled 104a, 104b and 104c, is provided to a corresponding alarm forecast block 126, individually labeled 126a, 126b and 126c as shown. Each of the alarm forecast blocks 126a, 226b and 126c is configured to forecasts whether a corresponding forecasted KPI value is expected to fall outside of its alarm limit based on the alarm identification model 120 and the corresponding forecasted KPI value 104a, 104b and 104c. FIG. 9 is a flow diagram showing an illustrative workflow 128 that represents a compilation of the other workflows. One addition in FIG. 9 is a block 130 that outputs the alarm forecasts.

Having thus described several illustrative embodiments of the present disclosure, those of skill in the art will readily appreciate that yet other embodiments may be made and used within the scope of the claims hereto attached. It will be understood, however, that this disclosure is, in many respects, only illustrative. Changes may be made in details, particularly in matters of shape, size, arrangement of parts, and exclusion and order of steps, without exceeding the scope of the disclosure. The disclosure's scope is, of course, defined in the language in which the appended claims are expressed.

What is claimed is:

1. A method for predicting predetermined Key Performance Indicators (KPIs) of an industrial process, the method comprising:

receiving, by a controller, a plurality of tags, wherein each tag identifies a corresponding KPI of the industrial process;

receiving, by the controller, historical values for each of the KPIs that are identified by the plurality of tags;

training, by the controller, a KPI forecast model for each of the KPIs that are identified by the plurality of tags, wherein each of the KPI forecast models is trained based at least in part on the received historical values for one or more KPIs of a plurality of the KPIs that are identified by the plurality of tags; and generating, by the controller, a forecasted KPI value for each of the KPIs identified by the plurality of tags based at least in part on the KPI forecast model that corresponds to the respective KPI;

receiving, by the controller, one or more alarm limits, historical alarms, and/or events associated with the one or more KPIs of the plurality of KPIs;

identifying, by the controller, one or more overlapping episodes associated with the one or more KPIs and related to the historical alarms and/or the events;

excluding, by the controller, the one or more overlapping episodes of the historical alarms and/or the events that are associated with the one or more KPIs of the plurality of KPIs;

training, by the controller, an alarm forecast model based on at least on the events associated with the one or more KPIs exclusive of the historical alarms and/or the events related to the one or more overlapping episodes of the historical alarms and/or the events; and determining, by the controller, using the trained alarm forecast model whether the forecasted KPI value is outside the corresponding alarm limit;

forecasting, by the controller, an alarm for each of the one or more KPIs based on the trained alarm forecast model, wherein the alarm forecasted by the trained alarm forecast model excludes the one or more overlapping episodes; and automatically adjusting, by the controller, one or more parameters associated with the industrial process based on the forecasted KPI values and the forecasted alarms, wherein the one or more parameters associated with the industrial process are adjusted to negate the forecasted alarm.

2. The method of claim 1, comprising:

receiving a time to forecast KPI value for each of the plurality of KPIs; and generating the forecasted KPI value for each of the plurality of KPIs identified by the plurality of tags at the time in future that corresponds to the time to forecast the KPI value.

3. The method of claim 2, wherein each of the KPI forecast models is trained based at least in part on the received historical values for the one or more KPIs of the plurality of KPIs of the industrial process that are identified by the plurality of tags and one or more of the forecasted KPI values.

4. The method of claim 1, wherein the industrial process comprises a plurality of plants, wherein each plant comprising two or more tags of the plurality of tags that each identify a corresponding KPI of the corresponding plant, and each plant has two or more predetermined plant states, and the method further comprising:

training a plant state forecast model for each of the plurality of plants, wherein each of the plant state forecast models is trained to forecast the plant state of the respective plant based at least in part on the received historical values for the corresponding KPIs that are associated with the respective plant and/or the forecasted KPI values for the corresponding KPIs that are associated with the respective plant; and generating a forecasted plant state for at least one of the plurality of plants of the industrial process based at least in part on the plant state forecast model that corresponds to the respective plant.

5. The method of claim 4, wherein each of the plant state forecast models is used to forecast the plant state of the respective plant based at least in part on the received historical values for the KPIs that are associated with the respective plant and one or more of the forecasted KPI values for one or more of the plurality of KPIs that are associated with the respective plant.

6. The method of claim 4, further comprising:

receiving the one or more alarm limits for the one or more KPIs of the plurality of KPIs associated with each of the plurality of plants; and wherein each of the plant state forecast models is trained to forecast the plant state of the respective plant based at least in part on the received historical values for the KPIs that are associated with the respective plant and the one or more alarm limits for the one or more KPIs of the plurality of KPIs associated with the respective plant.

7. The method of claim 6, wherein each of the plant state forecast models is trained to forecast the plant state of the respective plant based at least in part on the received historical values for the KPIs that are associated with the respective plant, the one or more alarm limits for the one or more KPIs of the plurality of KPIs associated with the respective plant, and one or more of the forecasted KPI values for one or more of the plurality of KPIs that are associated with the respective plant.

8. The method of claim 1, further comprising:

training the alarm forecast model for the one or more KPIs of the plurality of KPIs, wherein the alarm forecast model is trained based on the received historical values for the one or more KPIs of the plurality of KPIs, the historical alarms and/or the events associated with one or more KPIs of the plurality of KPIs, and one or more of the alarm limits for one or more KPIs of the plurality of KPIs.

9. The method of claim 8, wherein the alarm forecast model is also trained based on one or more of the forecasted KPI values.

10. The method of claim 8, further comprising:

generating a forecasted alarm for each of the one or more KPIs of the plurality of KPIs based the forecasted KPI value for the respective KPI.

11. The method of claim 8, wherein each of the historical alarms and/or the events associated with the one or more KPIs of the plurality of KPIs identify a source of the historical alarm and/or the event, a category of the historical alarm and/or the event and a condition of the historical alarm and/or the event, and wherein the alarm forecast model is trained based on the source, the category and/or the condition of one or more of the historical alarms and/or the events associated with the one or more KPIs of the plurality of KPIs of the industrial process.

12. A system for predicting predetermined Key Performance Indicators (KPIs) of an industrial process, the system comprising:

an I/O port;

a memory;

a controller operatively coupled to the I/O port and the memory, the controller configured to:

receive, via the I/O port, a plurality of tags, wherein each tag identify a corresponding KPI of the industrial process;

receive, via the I/O port, historical values for each of the KPIs that are identified by the plurality of tags;

train a KPI forecast model for each of the KPIs that are identified by the plurality of tags, wherein each of the KPI forecast models is trained based at least in part on the received historical values for one or more KPIs of a plurality of KPIs that are identified by the plurality of tags; and generate a forecasted KPI value for each of the plurality of KPIs identified by the plurality of tags based at least in part on the corresponding KPI forecast model that corresponds to the respective KPI;

receive one or more alarm limits, historical alarms, and/or events associated with the one or more KPIs of the plurality of KPIs;

identify one or more overlapping episodes associated with the one or more KPIs of the plurality of KPIs and related to the historical alarms and/or the events;

exclude, the one or more overlapping episodes of the historical alarms and/or the events that are associated with the one or more KPIs of the plurality of KPIs;

training, by the controller, an alarm forecast model based on at least on the events associated with the one or more KPIs of the plurality of KPIs exclusive of the historical alarms and/or the events related to the one or more overlapping episodes of the historical alarms and/or the events; and determine, using the trained alarm forecast model whether the forecasted KPI value is expected to fall outside the corresponding alarm limit;

forecast, an alarm for each of the one or more KPIs based on the trained alarm forecast model, wherein the alarm forecasted by the trained alarm forecast model excludes the one or more overlapping episodes; and automatically adjust, one or more parameters associated with the industrial process based on the forecasted KPI values and the forecasted alarms, wherein the one or more parameters associated with the industrial process are adjusted to negate the forecasted alarm.

13. The system of claim 12, wherein each of the KPI forecast models is trained based at least in part on the received historical values for the one or more KPIs of the plurality of KPIs of the industrial process that are identified by the plurality of tags and one or more of the forecasted KPI values.

14. The system of claim 12, wherein the industrial process comprises a plurality of plants, wherein each plant comprising two or more tags of the plurality of tags that each identify a corresponding KPI of the corresponding plant, and each plant has two or more predetermined plant states, and the controller is configured to:

train a plant state forecast model for each of the plurality of plants, wherein each of the plant state forecast models is trained to forecast the plant state of the respective plant based at least in part on the received historical values for the corresponding KPIs that are associated with the respective plant; and generate a forecasted plant state for at least one of the plurality of plants of the industrial process based at least in part on the plant state forecast model that corresponds to the respective plant.

15. The system of claim 12, wherein the controller is configured to:

train the alarm forecast model for the one or more KPIs of the plurality of KPIs, wherein the alarm forecast model is trained based on the received historical values for the one or more KPIs of the plurality of KPIs, the historical alarms and/or the events associated with the one or more KPIs of the plurality of KPIs, and one or more of the alarm limits for the one or more KPIs of the KPIs.

16. A non-transitory computer readably medium storing instructions that when executed by one or more processors causes the one or more processors to:

receive a plurality of tags wherein each tag identify a corresponding KPI of an industrial process;

receive historical values for each of the KPIs that are identified by the plurality of tags;

train a KPI forecast model for each of the KPIs that are identified by the plurality of tags, wherein each of the KPI forecast models is trained based at least in part on the received historical values for one or more KPIs of a plurality of KPIs that are identified by the plurality of tags; and generate a forecasted KPI value for each of the KPIs identified by the plurality of tags based at least in part on the corresponding KPI forecast model that corresponds to the respective KPI;

receive one or more alarm limits, historical alarms, and/or events associated with the one or more KPIs of the plurality of KPIs;

identify one or more overlapping episodes associated with the one or more KPIs of the plurality of KPIs and related to the historical alarms and/or the events;

exclude, the one or more overlapping episodes of the historical alarms and/or the events that are associated with the one or more KPIs of the plurality of KPIs;

train, by the controller, an alarm forecast model based on at least on the events associated with the one or more KPIs of the plurality of KPIs exclusive of the historical alarms and/or the events related to the one or more overlapping episodes of the historical alarms and/or the events; and determine, using the trained alarm forecast model whether the forecasted KPI value is expected to fall outside the corresponding alarm limit;

forecast, an alarm for each of the one or more KPIs based on the trained alarm forecast model, wherein the alarm forecasted by the trained alarm forecast model excludes the one or more overlapping episodes; and automatically adjust, one or more parameters associated with the industrial process based on the forecasted KPI values and the forecasted alarms, wherein the one or more parameters associated with the industrial process are adjusted to negate the forecasted alarm.

\* \* \* \* \*